(12) United States Patent
Serrano

(10) Patent No.: US 7,333,410 B2
(45) Date of Patent: Feb. 19, 2008

(54) METHOD AND APPARATUS FOR CANCELING REPEATABLE RUN-OUT ERRORS IN POSITIONING ON RECORDING MEDIUM

(75) Inventor: Louis J. Serrano, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 649 days.

(21) Appl. No.: 10/928,493

(22) Filed: Aug. 27, 2004

(65) Prior Publication Data

US 2006/0072412 A1 Apr. 6, 2006

(51) Int. Cl.
G11B 7/00 (2006.01)
(52) U.S. Cl. .................................. 369/53.14; 369/53.19
(58) Field of Classification Search ............. 369/53.19, 369/53.18, 53.16, 53.15, 53.14, 53.12; 360/77.04
See application file for complete search history.

(56) References Cited

U.S. PATENT DOCUMENTS 6,144,517 A * 11/2000 Watanabe et al. ........ 360/77.04

OTHER PUBLICATIONS

"Comparative Studies on Repeatable Runout Compensation Using Iteractive Learning Control", pp. 1-2, http://www.eng.nusedu.sg/EResnews/1001/rd/re_7.html, May 18, 2004.
Daniel Abramovitch et al., "Decomposition of Baseline Noise Sources in Hard Disk Position Error Signals Using the PES Pareto Method", In the Proceedings of the 1997 American Controls Conference in Albuquerque, NM, Jun. 3-6, 1997, pp. 1-5.

* cited by examiner

Primary Examiner—Nabil Hindi
(74) Attorney, Agent, or Firm—Thelen Reid Brown Raysman & Steiner LLP

(57) ABSTRACT

A method and apparatus cancel repeatable run-out (RRO) errors in positioning on a recording medium using a RRO cancellation control voltage. The RRO cancellation includes (a) estimating a rotation period of the recording medium, (b) determining an update interval for the RRO cancellation control voltage based on the estimated rotation period and a desired number of updates to be performed per rotation, (c) updating a value of the RRO cancellation control voltage if a time period passed from a last update is greater than the update interval, and (d) applying the updated RRO cancellation voltage to control the positioning. A phase and a magnitude of the RRO cancellation control voltage may be determined for a RRO frequency range.

61 Claims, 6 Drawing Sheets

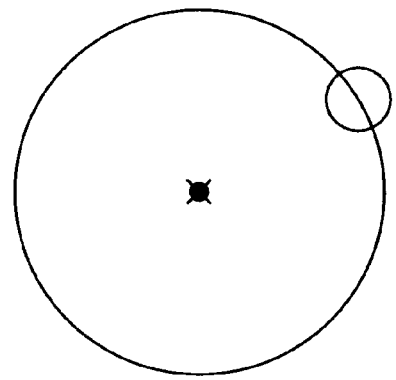
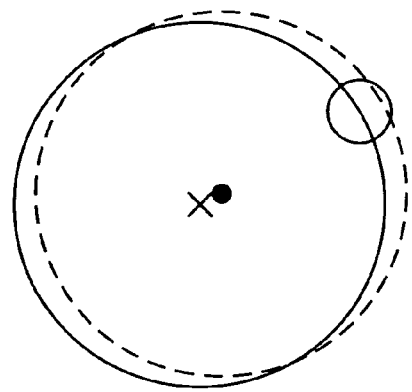
FIG. 1A  FIG. 1B
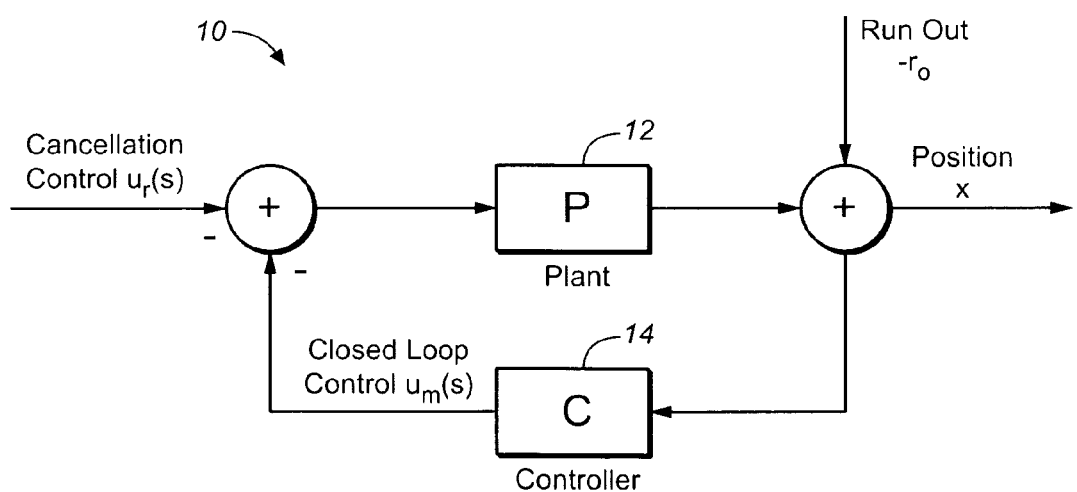
FIG. 2

US 7,333,410 B2

METHOD AND APPARATUS FOR CANCELING REPEATABLE RUN-OUT ERRORS IN POSITIONING ON RECORDING MEDIUM

FIELD OF THE INVENTION

The present invention relates to disc drivers and disc drive control systems. More particularly, the present invention relates to a method and apparatus for canceling repeatable run-out errors in positioning on a recording medium in a disc driver.

BACKGROUND OF THE INVENTION

An optical drive system, such as a compact disc (CD) player or digital versatile disc (DVD) player, can be divided into two parts: a controller and a plant. The plant encompasses physical mechanisms (drivers, sensors, motors, read-write heads, and the like) while the controller is typically implemented as a computer program on a digital signal processor (DSP). For example, the controller provides a head-positioning servomechanism which aims at positioning the read-write head over the desired track on the optical disc with minimum error. The track positioning has two functions: track-seeking and track-following. The repeatable run-out (RRO) error is a repeatable, predicable off-track motion caused by a mis-centering of an optical disc on the spindle motor. FIG. 1A shows an optical disc ideally placed on the spindle motor, while FIG. 1B illustrates an optical disc placed on the spindle motor off-centered. The RRO causes the read/write head off track which may degrade reading and writing data to/from the optical disc.

In a disc driver system, the spindle speed is measured using pulses from the spindle motor driver. These pulses are typically provided by Hall sensors, which detect the magnetization of the spindle motor. In one complete revolution, a Hall sensor will change its state the same number of times the motor magnetization changes, typically, six (6). There are usually three Hall sensors, and thus there are usually eighteen (18) pulses per revolution for a three-phase six-pole spindle motor. These pulses are often referred to as frequency generation (FG) pulses, since they provide for the generation of a frequency signal from the spindle motor.

Conventional error cancellation techniques in hard disc drivers use the fact that the tracking actuator is synchronous to the spindle motor. In optical disc drivers, such as CD or DVD drivers, however, this is not true because the tracking servo operates at a fixed rate whereas the spindle servo typically operates at variable rotation speed. The tracking servo mechanism measures its position relative to track center and produces a control signal at exact times. For example, a typical servo system may operate about 50,000 iterations per second. The spindle servo, on the other hand, operates at variable speed. Because optical disc drivers often try to keep the data moving under the spot at a constant rate, which is referred to constant linear velocity (CLV) mode, the spindle speed changes with the radius of the location of the data. Consequently, the tracking servo and spindle control are asynchronous.

Thus, conventional RRO error cancellation in optical disc drivers uses the FG signal from Hall effect sensors to synchronize the cancellation algorithm to the spindle revolution. The RRO cancellation is triggered at each edge of the FG signal. For example, if the spindle motor is provided with three (3) Hall sensors, the FG signal has 18 pulses. Accordingly, the number of Hall sensors in the driver system, i.e., the number of FG signal pulses predetermines the fixed number of RRO cancellation control per spindle rotation. However, in order to reduce the manufacturing cost of optical drivers, there are many spindle motor drivers which provide the output of only one Hall sensor. In such spindle motor drivers, the number of the FG pulses available to the servo system is very limited. In such optical drivers, the conventional RRO cancellation can be very poor.

BRIEF DESCRIPTION OF THE INVENTION

A method and apparatus cancel repeatable run-out (RRO) errors in positioning on a recording medium using a RRO cancellation control voltage. The RRO cancellation includes (a) estimating a rotation period of the recording medium, (b) determining an update interval for the RRO cancellation control voltage based on the estimated rotation period and a desired number of updates to be performed per rotation, (c) updating a value of the RRO cancellation control voltage if a time period passed from a last update is greater than the update interval, and (d) applying the updated RRO cancellation voltage to control the positioning. A phase and a magnitude of the RRO cancellation control voltage may be determined for a RRO frequency range.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1A is a diagram schematically illustrating an optical disc ideally placed on the spindle motor.

FIG. 1B is a diagram schematically illustrating an optical disc placed on the spindle motor off-centered.

FIG. 2 is a block diagram schematically illustrating a closed loop servo-system suitable for implementing aspects of the present invention.

DETAILED DESCRIPTION

Figure 3:
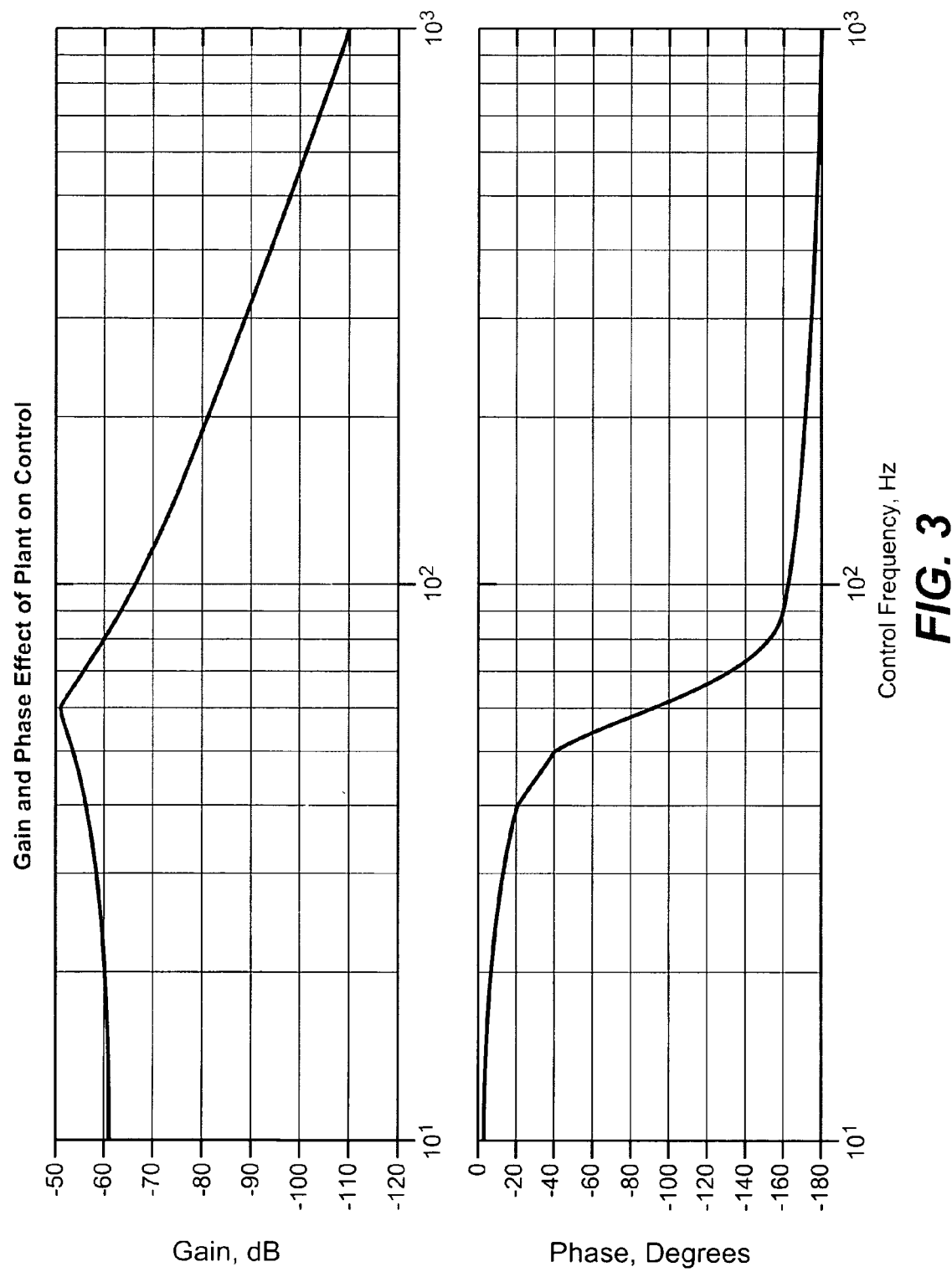
FIG. 3 is a diagram schematically illustrating the gain and phase effect of the plant on the cancellation control $u_r(s)$ in accordance with one embodiment of the present invention.

Embodiments of the present invention are described herein in the context of a method and apparatus for canceling repeatable run-out errors in positioning on a recording medium. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

FIG. 2 schematically illustrates a closed loop servo-system 10 suitable for implementing aspects of the present invention. As shown in FIG. 2, the servo-system 10 includes a plant 12 and a controller 14. As described above, the plant 12 encompasses physical mechanisms such as drivers, sensors, motors, read-write heads, and the like, and the controller 14 is typically implemented as a computer program on a digital signal processor (DSP). The transfer function of the plant 12 is designated P(s), while the transfer function of the controller 14 is designated C(s), which are interconnected as shown in FIG. 2. FIG. 2 also illustrates the locations in the loop where the run out error $r_o(s)$ enters, where the tracking error x(s) is measured, where the run-out cancellation control $u_r(s)$ is applied, and where the control $u_m(s)$ out of the controller is measured. In FIG. 2, measurement noise is ignored for simplicity. It should be noted that these variables are expressed in the frequency domain using the s parameter. When these variables are used to measure a response or calculate a control, they are considered to be true only in the range of frequencies of interest, and only on average. For example, a statement that "the cancellation control is set equal to the measured control" means that the statement is true at the run-out frequency range and only in an average sense.

Using simple loop algebra, in order for the control $u_r(s)$ to cancel the run-out terror $r_o(s)$, the following equation should be true:

$$P(s) \cdot u_r(s) = r_o(s) \tag{1}$$

That is, $$u_r(s) = r_o(s)/P(s) \tag{2}$$

In addition, if the loop is closed, the run-out error $r_o(s)$ cannot be observed directly. Instead, its effect on either the tracking error x(s) or on the measured control $u_m(s)$ is observed. The effect on the tracking error is $$x(s) = \frac{1}{1+P(s)C(s)} r_o(s), \tag{3}$$

and the effect on the measured control $u_m(s)$ is $$u_m(s) = \frac{C(s)}{1+P(s)C(s)} r_o(s). \tag{4}$$

Consequently, after measuring the tracking error x(s), the cancellation control $u_r(s)$ should be set to $$u_r(s) = \frac{r_o(s)}{P(s)} = \frac{1+P(s)C(s)}{P(s)} x(s). \tag{5}$$

As an alternative, after measuring the controller output $u_m(s)$, we should set the cancellation control $u_r(s)$ to $$u_r(s) = \frac{r_o(s)}{P(s)} = \frac{1+P(s)C(s)}{P(s)C(s)} u_m(s). \tag{6}$$

Since repeatable run-out occurs only at the spindle speed and its harmonics, the values of the transfer functions and the signals need only be known at those frequencies.

A sample plant transfer function P(s) is shown in FIG. 3, which illustrates the gain and phase effect of the plant on the cancellation control $u_r(s)$. In this sample, the plant 12 is assumed to be a simple spring-mass system with the gain which increases as the control frequency approaches the system resonance frequency of about 60 Hz. Since the plant transfer function P(s) depends on frequency, the cancellation control $u_r(s)$ will change as the run out frequency changes, even if the run out phase and magnitude do not.

Figure 4:
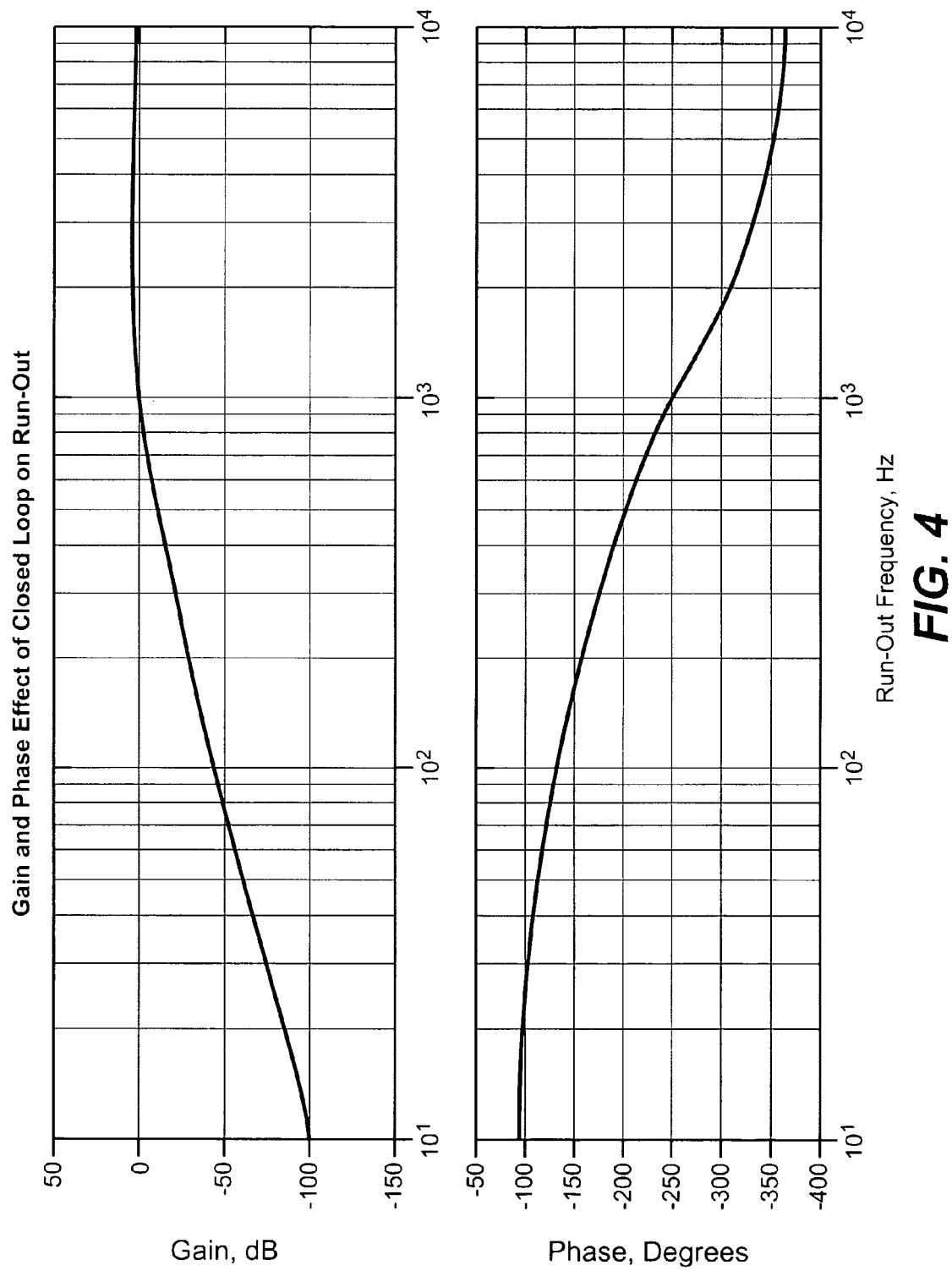
FIG. 4 is a diagram schematically illustrating the gain and phase effect of the closed loop on the run-out error $r_o(s)$ in accordance with one embodiment of the present invention.

When the loop is closed, low frequency disturbances like RRO are suppressed. The relation between the open-loop run-out (the run out seen when the controller 14 is not on) and the closed loop run-out is given by the error loop transfer function. The closed loop transfer function is shown in FIG. 4, which illustrates the gain and phase effect of the closed loop on the run-out error $r_o(s)$. It is observed that the effect on the run-out error $r_o(s)$ changes as the run-out frequency changes. For example, at 10 Hz, the run-out is attenuate by 100 dB, so that 100 tracks of open loop run-out would be seen as 0.1% of a track when the loop is closed.

With this amount of attenuation, RRO cancellation is not needed. However, at 100 Hz, the attenuation is only about 40 dB, so that a full track of closed-loop run-out can be seen. Run-out of this size would prevent a DVD player from operating, requiring RRO cancellation. Rotation rates around 100 Hz are typically seen at 4xDVD speeds.

As described above, in a conventional optical driver system, the tracking servo and the spindle control are asynchronous. In order to make a spindle control synchronous to the spindle motor, the FG pulses from the spindle motor are used to provide timing for the spindle control. That is, the spindle control is updated and the spindle speed is measured only on the FG pulses. This same method can be used to provide timing for RRO measurement and cancellation such that the RRO cancellation is kept synchronized with the RRO, regardless of the spindle speed. However, the applicant realized that this reduces flexibility as it fixes the upper limit of the number of measurements and control updates that can be made per spindle revolution.

The RRO has several characteristics. First, most of the energy in the RRO is at the same frequency as the spindle speed. Therefore, a sinusoid can cancel most of the RRO, if the correct phase and magnitude are known. Second, the open-loop RRO is largely constant across the disc. That is, it depends on spindle motor phase and not radius. Third, the open loop run-out does not depend on the servo system, but the closed loop run-out will. Finally, the open loop run-out does not change in phase or magnitude much if the spindle speed changes, but the closed loop run-out will. This is because the response of the closed loop servo system (both plant and controller) is not constant in frequency.

Canceling the RRO when the spindle is operating in Constant Angular Velocity (CAV) mode is relatively simple. Since the spindle does not change its speed, once the RRO is measured and the control is calculated, there will usually be little or no change over time. However, in Constant Linear Velocity (CLV) mode, the spindle speed is constantly changing. This is because the linear distance around the disc increases as the radius increases. Thus, in order to maintain a constant data rate, the spindle velocity must slow down as an optical pickup unit (OPU) spirals out. Since the largest component of the RRO has the same frequency as the spindle, the RRO changes its frequency as the spindle motor changes its speed.

The link between the RRO and the spindle speed arises because the primary component of the RRO is caused when a disc is loaded into an optical drive and there is a slight offset between the center of rotation and the center of the disc. This offset causes a relative motion between the stationary OPU and the track to be read at the same frequency as at which the disc is rotating. The open loop error amount (the amount seen when the servo is not trying to follow the track) can be more than 100 tracks. However, the servo is capable of mostly following this motion, and thus the closed loop RRO is only a fraction of a track. However, it is still advantageous to cancel this, as even a small remaining track mis-registration (TMR) can make it difficult to read and write the disc.

In accordance with one embodiment of the present invention, cancellation of the RRO is done by issuing a sinusoidal control signal at the same frequency as the RRO. While the required frequency is known from the spindle rotation speed, in order to cancel the RRO the appropriate phase and magnitude of the control must be determined. In theory, this is simple. If the cancellation control signal has frequency $f_o$, magnitude $A_r$, phase (relative to a known, fixed point) of $\theta_r$, and at this frequency $f_o$ the plant magnitude response is $A_p$ and the phase response is $\theta_p$, then the position arising from this control is a sine wave at frequency $f_o$ with magnitude $A_r * A_p$ and phase of $\theta_r + \theta_p$.

To cancel the RRO, this response must have the same phase and magnitude as the RRO, but be opposite in sign. Thus, to cancel a given RRO disturbance, the magnitude and phase response of the plant at the spindle frequency must be known. However, since the spindle frequency changes with time, the plant response must be known for a range of frequencies.

Another part of canceling the RRO is determining the phase $\theta_r$ and magnitude $A_r$ of the open loop run-out itself. They can be measured in several ways. After the lens of the OPU is focused, but before the tracking loop is closed, the phase $\theta_r$ and magnitude $A_r$ can be measured by observing the tracking signal. Since the open-loop RRO is far larger than one track, but the tracking signal wraps at each track, the observed tracking signal must be carefully unwrapped to determine the original open-loop RRO. However, once this is done, the magnitude and phase can be readily determined by, for example, calculating a single point Discrete Fourier Transform (DFT) at the frequency of interest.

A second method to determine the run-out uses the relations (1) through (6) discussed above. Since the closed loop control $u_m(s)$ can be measured after track lock, the desired control discussed above is $$u_r(s) = \frac{r_o(s)}{P(s)} = \frac{1 + P(s)C(s)}{P(s)C(s)} u_m(s), \tag{6}$$

and for low frequencies like the run-out frequency, $$\frac{1 + P(s)C(s)}{P(s)C(s)} \approx 1. \tag{7}$$

That is, the cancellation control $u_r(s)$ can be set as $u_r(s) = u_m(s)$. A clear advantage of this method is that precise knowledge of the closed loop dynamics of the system are not required. It is only needed that for the range of frequencies of interest the closed loop is approximately one.

A third method for measuring the run-out is to measure the tracking error $x(s)$. Given this measurement of the tracking error $x(s)$, the cancellation control $u_r(s)$ can be found to be $$u_r(s) = \frac{r_o(s)}{P(s)} = \frac{1 + P(s)C(s)}{P(s)} x(s). \tag{8}$$

Since $$\frac{1 + P(s)C(s)}{P(s)C(s)} \approx 1, \tag{7}$$

it follows that $$\frac{1 + P(s)C(s)}{P(s)} \approx C(s). \tag{9}$$

The phase and gain of the measured tracking error $x(s)$ needs be adjusted by the phase and gain of the controller at the run-out frequency. This value is known by design, and typically stored in the servo program, for example, via a table lookup or other method.

Each of these methods has advantages and disadvantages. The magnitude and phase of the open loop run-out does not change as the spindle motor changes its frequency (rotation speed). However, its effect does change, and the cancellation control $u_r(s)$ must take this effect into account. This will be done when the open loop run-out is divided by the plant gain and phase at the run-out frequency, since the plant gain and phase change with frequency. Thus, the cancellation control $u_r(s)$ is constantly re-calculated as the spindle speed changes. Also, the plant gain and phase at all the run-out frequencies must be known.

Monitoring the controller output $u_m(s)$ gives the cancellation control $u_r(s)$ directly. However, this value changes as the run-out frequency changes, and thus the controller output $u_m(s)$ needs to be continually measured so as to continuously adjust the cancellation control $u_r(s)$. Monitoring the tracking error $x(s)$ has disadvantages of both the previous two methods. Finding the cancellation control $u_r(s)$ requires the knowledge of the response of the controller $C(s)$, while the tracking error $x(s)$ itself will change as the run-out frequency changes.

A fourth method of canceling the RRO is: measuring the controller output $u_m(s)$ at a frequency in the middle of the range of frequencies over which the spindle will operate, for example, from 10 Hz to 25 Hz, or from 50 Hz to 125 Hz, calculate the RRO cancellation control at that frequency, then applying it without regard to the actual spindle frequency. This method is less effective than the prior three methods, but often employed since it is easier. This method reduces the RRO, but does not eliminate it. However, this reduction may be adequate for certain servo designs.

Once the required magnitude, phase, and frequency of the canceling control $u_r(s)$ are obtained, a sine wave having those characteristics is generated. For example, a lookup table or difference equation can be used to generate the sine wave. With table lookup, an indexed list of N values is stored, where the value at the $k^{th}$ entry is $\sin(2*\pi*k/N)$. The frequency of the sine wave is controlled by stepping through the table at the right rate, while the phase is controlled by offsetting the index. Interpolation of the table values can be used as necessary. The magnitude is controlled by multiplying the resulting lookup value as needed.

A second order difference equation will also generate a sine wave, if the coefficients are picked correctly. The frequency is controlled by selecting the coefficients of the equation, while the phase is given by selecting the initial conditions (that is, starting the calculation at a different point.) The magnitude is controlled by multiplying the result of the equation. The equation to generate a sinusoid with N steps per cycle is $$x(k+1) = 2 \cdot \cos\left(\frac{2\pi}{N}\right) \cdot x(k) - x(k-1). \tag{10}$$

Initial values for $x(1)$ and $x(0)$ are picked to give the right gain and phase.

Figure 5:
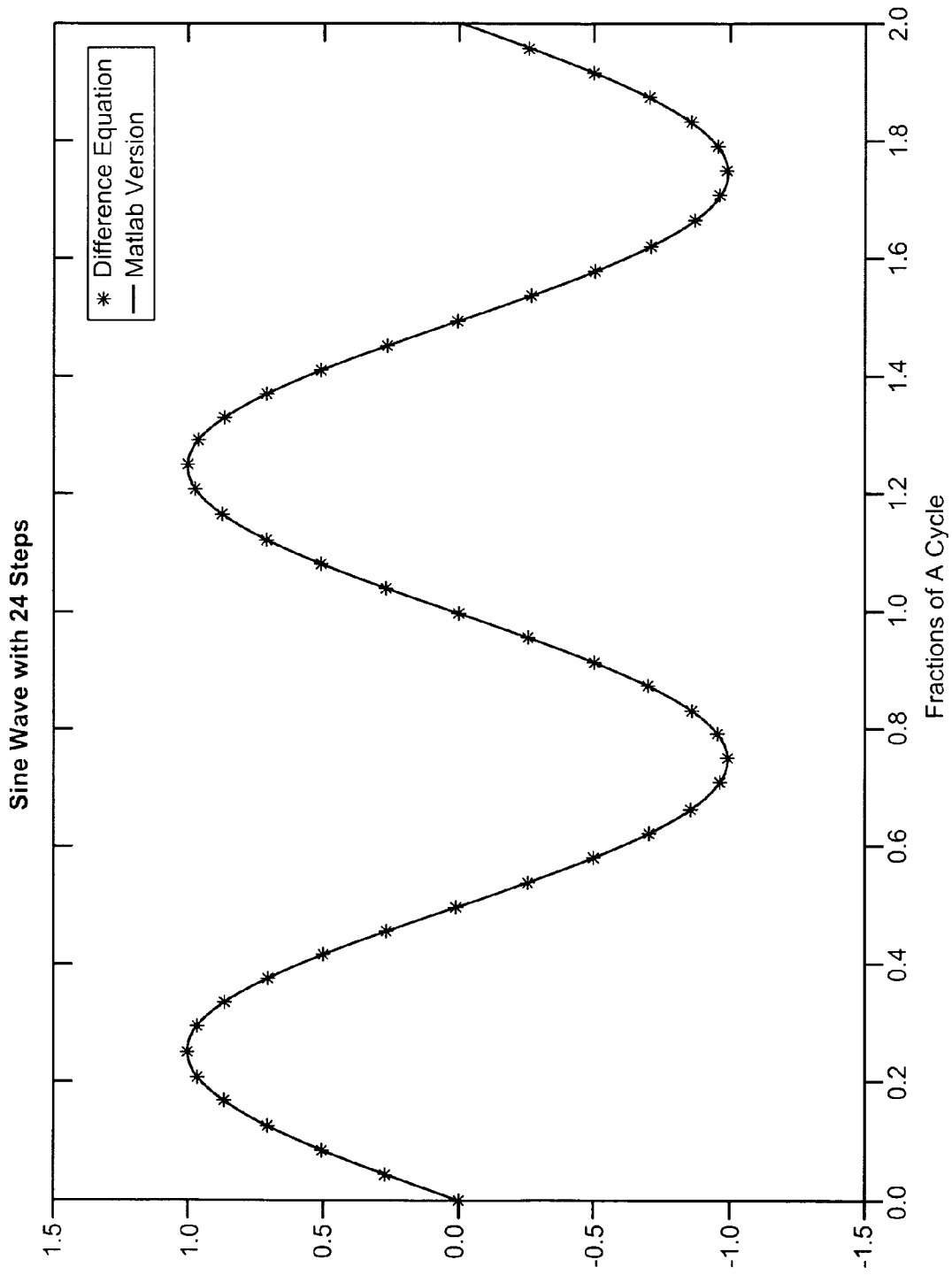
FIG. 5 is a diagram schematically illustrating an example of a sine wave generated with a difference equation compared with a sine wave generated using floating-point computation in accordance with one embodiment of the present invention.

With both these methods, computation is dramatically reduced by making the updates synchronous to the spindle motor rotation. For instance, if there are 24 updates per RRO cycle, then the lookup table can contain 24 entries, and each RRO cancellation output requires looking up the next table entry. Similarly, the coefficients of the difference equation depend only on the number of updates, and not the frequency of the spindle motor. Therefore, they need not change even if the frequency of the RRO changes. They need only change if the magnitude and phase of the RRO change. FIG. 5 illustrates an example where a sine wave generated with the above difference equation is compared to a sine wave generated using floating-point computation.

For the reasons discussed above, making the RRO cancellation synchronous with the spindle motor is the preferred method. However, restricting the number of updates in one cycle to match the number of the FG pulses can reduce the ability of the control to cancel the RRO. This happens for two reasons. The first is straightforward: because the control is constant between updates, it is approximating the RRO with a piecewise constant, or stair-step function. Thus, the more updates, the more precise the approximation. The second reason is that the piecewise constant control has frequency content at the odd harmonics of the spindle frequency, i.e., the fewer the pulses, the lower in frequency and more energetic these harmonics. Their effect is to create the RRO at the harmonic frequencies, which is undesirable. Consequently, a higher number of pulses produce better RRO cancellation, and hence decoupling the control updates from the number of the FG pulses will allow for a better control.

Therefore, in accordance with one embodiment of the present invention, the times that the RRO is measured and a canceling control is issued are synchronized to the spindle motor, but they can occur at any evenly spaced fraction of one revolution of the spindle motor.

Figure 6:
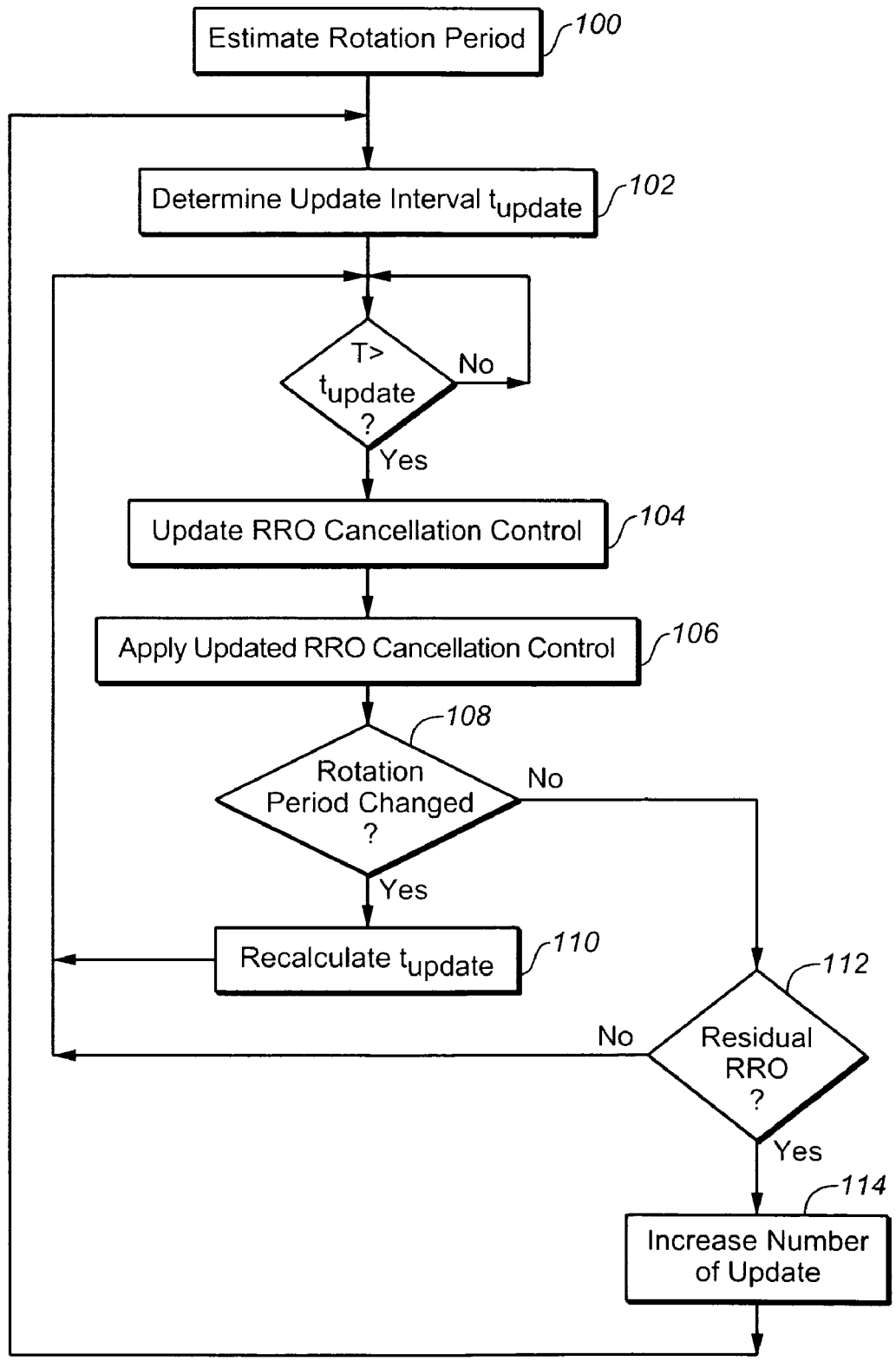
FIG. 6 is a process flow diagram schematically illustrating a method for canceling repeatable run-out (RRO) errors in positioning on a recording medium in accordance with one embodiment of the present invention.

FIG. 6 schematically illustrates a method for canceling repeatable run-out (RRO) errors in positioning on a recording medium in accordance with one embodiment of the present invention. The method may be implemented in, for example, a servo system for an optical disc driver such as shown in FIG. 2, using a RRO cancellation control voltage $u_r(s)$ which may be obtained as described above. The recording medium is typically an optical recording medium such as a compact disc (CD) or a digital versatile disc (DVD). However, the present invention is also applicable any recoding medium which rotation speed is controlled variably.

As shown in FIG. 6, the rotation period of the recording medium is estimated (100). For example, the rotation speed of the spindle motor which is driving the recording medium can be measured. The FG pulses from the Hall sensors may be used for this measurement. For example, the time period $T_{rev}$ for one revolution of the spindle motor (six FG pulses from a Hall sensor) can be measured. Alternatively, the rotation period can be estimated from a current target speed of the spindle motor, which is typically obtained from the servo control information to achieve the constant linear velocity. Then an update interval $t_{update}$ for the RRO cancellation control voltage is determined (102) based on the estimated rotation period and a desired number of updates to be performed per rotation. The update interval $t_{update}$ dictates how often the RRO cancellation control voltage $u_r(s)$ is to be updated per revolution of the recording medium. A value of the RRO cancellation control voltage is updated if a time period T passed from a last update is greater than the update interval (104). The time period passed from the last update may be measured using a software timer independent of rotation of the spindle motor. For example, the servo interrupt (a typical servo sample: 20μ seconds) in the servo control program can be used as a 50 KHz clock signal. Any flag can also be used to generate a similar clock signal. Alternatively, a counter circuit independent of rotation of a spindle motor may also used as a hardware timer. When the predetermined time lapses, the updated RRO cancellation voltage is applied to control the positioning (106). It should be noted that, as shown in FIG. 2, the RRO cancellation control voltage $u_r(s)$ is applied through a feed-forward control, not in the feed-back control.

In accordance with one embodiment of the present invention, the spindle motor speed may be monitored (108), and if the spindle motor speed (i.e., the rotation period) change, the update interval for the RRO cancellation control voltage may be recalculated (110) such that the desired number of updates are performed per rotation. In addition, a residual RRO may be monitored (112), and the number of the update per rotation may be increased based on an amount of the residual RRO (114).

The RRO cancellation voltage can be generated as a sinusoidal function by determining a phase and a magnitude of the RRO cancellation control voltage for a RRO frequency range, as described above. Such a sinusoidal function having the phase and the magnitude of the RRO cancellation control voltage can be stored as a lookup table. Alternatively, the sinusoidal function can be calculated using a difference equation. Since the cancellation control is only updated a few times per RRO cycle, a stair-step function can be used to cancel a continuous sine wave of the actual run-out. The more the updates, the less the error in this approximation, and hence the increased number of updates provide the better RRO cancellation control. Also, if the residual RRO is monitored, more updates means more measurements which yield less noise in the resulting estimation of the residual RRO.

As described above, when determining the RRO cancellation control voltage, a servo control voltage (the controller output $u_m(s)$) in a feedback control loop may be measured at a RRO frequency range when the positioning is locked. Alternatively, a tracking error $x(s)$ in the positioning may be measured for a RRO frequency range when the positioning is locked.

Figure 7:
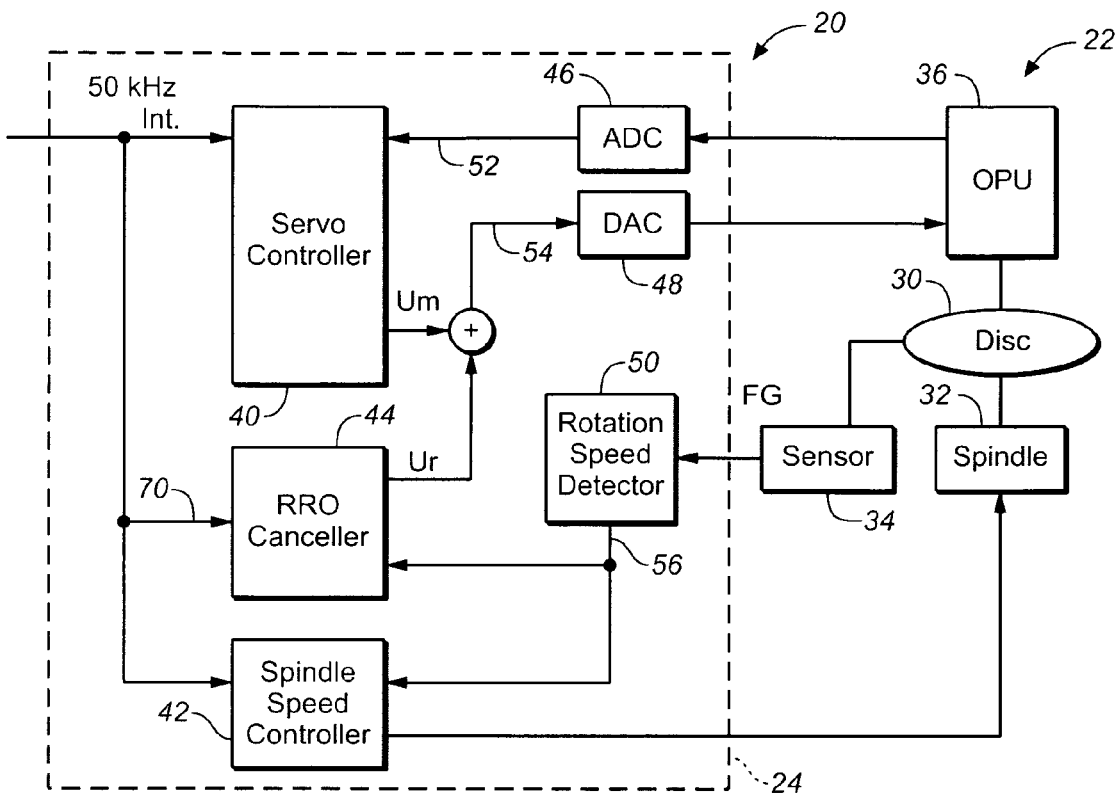
FIG. 7 is a block diagram schematically illustrating a servo system implementing a repeatable run-out (RRO) error canceller in accordance with one embodiment of the present invention.

FIG. 7 schematically illustrates a servo system 20 implementing a repeatable run-out (RRO) error canceller in accordance with one embodiment of the present invention. The servo system 20 includes a plant part 22 and a controller part 24. The plant part 22 is physical mechanisms for driving a optical recording medium (optical disc) 30, including a spindle motor 32, a sensor (for example, a set of Hall sensors) 34, and an optical pickup unit (OPU) 36 such as a read-write head. Other physical mechanisms of the disc driver are not shown in FIG. 7 for simplicity, but are well understood by one of ordinary skill in the art. The optical recording medium 30 may be a compact disc (CD), a digital versatile disc (DVD), or the like.

The controller part 24 is typically implemented as a computer program on a digital signal processor (DSP), but can be any combination of software and hardware. The controller part 24 includes a servo controller 40, a spindle speed controller 42, and an RRO canceller 44. The controller part 24 further includes an analog-digital converter (ADC) 46, a digital-analog converter 48, and a spindle rotation speed detector 50. A feedback signal 52 from the OPU 36 is supplied to the servo controller 40 through the ADC 46, and a control signal 54 from the controller part 24 is applied to the OPU 36 through the DAC 48. The control signal 54 includes both the output $u_m(s)$ of the servo controller 40 and the output $u_r(s)$ of the RRO canceller 44 (RRO cancellation control), as shown in FIG. 7. The rotation speed detector 50 receives a pulse signal such as a FG signal from the sensor 34 and supplies a speed signal 56 to the RRO canceller 44 and the spindle speed controller 42. The servo controller 40 controls tracking and positioning of the OPU 36. The spindle speed controller 42 is coupled to the rotation speed detector 50 and the spindle motor 32 of the disc driver, and controls the rotation speed of the spindle motor 32, for example, to achieve a constant liner velocity.

Figure 8:
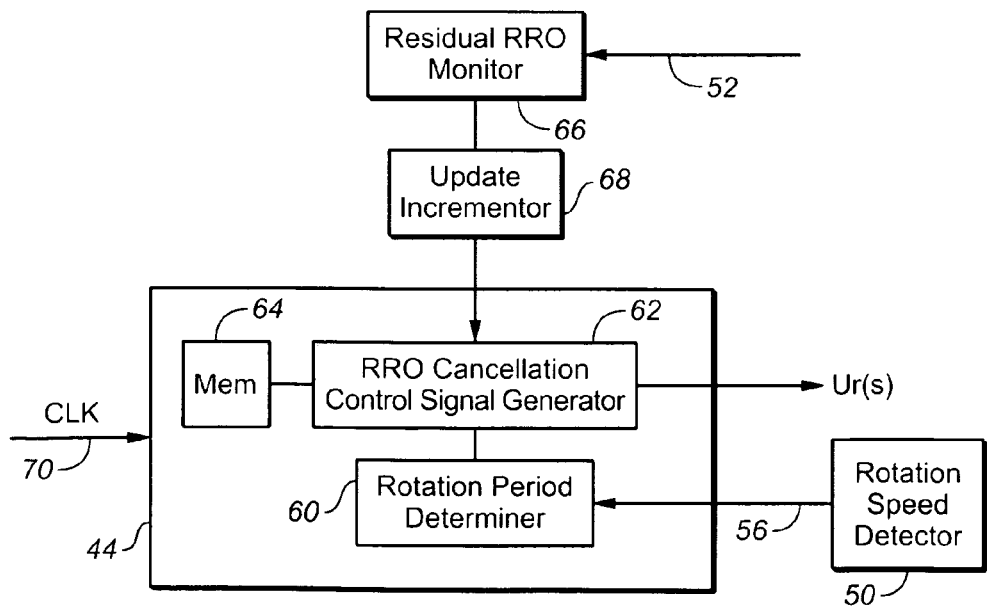
FIG. 8 is a block diagram schematically illustrating an example of the RRO canceller in accordance with one embodiment of the present invention.

FIG. 8 schematically illustrates an example of the RRO canceller 44 in accordance with one embodiment of the present invention. As shown in FIG. 8, the RRO canceller 44 includes a rotation period determiner 60 and an RRO cancellation control signal generator 62. The rotation period determiner 60 receives the speed signal 56 through the rotation speed detector 50 and determines the rotation period of the spindle motor, i.e., that of the recording medium 30, from the speed signal 56. The RRO cancellation control signal generator 62 is coupled to the rotation period determiner 60, and outputs an updated cancellation control signal $u_r(s)$ at an update interval such that a desired number of updates are performed per rotation. A clock signal 70 independent of rotation of the spindle motor may be used to generate and issue the updated RRO cancellation control signal. The clock signal 70 may be supplied by a software timer, or a hardware counter. A servo interrupt signal in the servo control program (with a typical servo sample: 20µ seconds, i.e., 50 KHz) can be used as the clock signal 70, as shown in FIG. 7.

Referring back to FIG. 8, in accordance with one embodiment of the present invention, the RRO cancellation control signal generator 62 includes a memory 64 adapted to store information of a sinusoidal function representing the RRO cancellation control voltage. Such information may be in form of a lookup table. Alternatively, the RRO cancellation control signal generator 62 includes a calculator (not shown) adapted to calculate a sinusoidal function representing the RRO cancellation control voltage using a difference equation.

In accordance with one embodiment of the present invention, the rotation period determiner 60 includes a rotation period calculator adapted to calculate a rotation period of a spindle motor based on a target speed of the spindle motor and servo control information. In addition, the rotation period determiner 60 may also include a rotation period re-calculator adapted to recalculate the update interval for the RRO cancellation control voltage if the rotation period changes.

In accordance with one embodiment of the present invention, the servo system 20 may further include a residual RRO monitor 66 to monitor a residual RRO, and an update incrementor 68 coupled to the monitor 66 and the RRO cancellation control signal generator 62. The monitor 66 may be implemented in the servo controller 40 to receive the feedback signal 52, or provided independently for the RRO canceller 44. The update incrementor 68 increases the number of update based on an amount of the residual RRO.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for canceling repeatable run-out (RRO) errors in positioning on a recording medium using a RRO cancellation control voltage, said method comprising:
   estimating a rotation period of the recording medium;
   determining an update interval for the RRO cancellation control voltage based on the estimated rotation period and a desired number of updates to be performed per rotation;
   updating a value of the RRO cancellation control voltage if a time period passed from a last update is greater than the update interval; and applying the updated RRO cancellation voltage to control the positioning.

2. The method of claim 1, further comprising:
determining a phase and a magnitude of the RRO cancellation control voltage for a RRO frequency range.

3. The method of claim 2, further comprising:
generating a sinusoidal function having the phase and the magnitude of the RRO cancellation control voltage.

4. The method of claim 3, further comprising:
storing information of the sinusoidal function representing the RRO cancellation control voltage.

5. The method of claim 3, further comprising:
calculating the sinusoidal function using a difference equation.

6. The method of claim 2, wherein said determining the RRO cancellation control voltage includes:
measuring a servo control voltage in a feedback control loop for a driving system of the recoding medium, the servo control voltage being measured for a RRO frequency range when the positioning is locked.

7. The method of claim 2, wherein said determining the RRO cancellation control voltage includes:
measuring a tracking error in the positioning for a RRO frequency range when the positioning is locked.

8. The method of claim 1, wherein said estimating the rotation period includes:
measuring a rotation period of a spindle motor adapted to drive the recording medium.

9. The method of claim 1, wherein said estimating the rotation period includes:
determining a rotation period of a spindle motor based on a target speed of the spindle motor.

10. The method of claim 1, further comprising:
recalculating the update interval for the RRO cancellation control voltage if the rotation period changes.

11. The method of claim 1, wherein in said updating the time period is measured using a software timer independent of rotation of a spindle motor adapted to drive the recording medium.

12. The method of claim 1, wherein in said updating the time period is measured using a counter independent of rotation of a spindle motor adapted to drive the recording medium.

13. The method of claim 1, wherein the RRO cancellation control voltage is applied through a feed-forward control.

14. The method of claim 1, wherein the recording medium includes:
a compact disc (CD); and
a digital versatile disc (DVD).

15. The method of claim 1, wherein the recording medium is an optical recording medium.

16. The method of claim 1, further comprising:
monitoring a residual RRO; and
increasing the number of update based on an amount of the residual RRO.

17. An apparatus for canceling repeatable run-out (RRO) errors in positioning on a recording medium using a RRO cancellation control voltage, said apparatus comprising:
means for estimating a rotation period of the recording medium;
means for determining an update interval for the RRO cancellation control voltage based on the estimated rotation period and a desired number of updates to be performed per rotation;
means for updating a value of the RRO cancellation control voltage if a time period passed from a last update is greater than the update interval; and
means for applying the updated RRO cancellation voltage to control the positioning.

18. The apparatus of claim 17, further comprising:
means for determining a phase and a magnitude of the RRO cancellation control voltage for a RRO frequency range.

19. The apparatus of claim 18, further comprising:
means for generating a sinusoidal function having the phase and the magnitude of the RRO cancellation control voltage.

20. The apparatus of claim 19, further comprising:
means for storing information of the sinusoidal function representing the RRO cancellation control voltage.

21. The apparatus of claim 19, further comprising:
means for calculating the sinusoidal function using a difference equation.

22. The apparatus of claim 18, wherein said means for determining the RRO cancellation control voltage includes:
means for measuring a servo control voltage in a feedback control loop for a driving system of the recoding medium, the servo control voltage being measured for a RRO frequency range when the positioning is locked.

23. The apparatus of claim 18, wherein said means for determining the RRO cancellation control voltage includes:
means for measuring a tracking error in the positioning for a RRO frequency range when the positioning is locked.

24. The apparatus of claim 17, wherein said means for estimating the rotation period includes:
means for measuring a rotation period of a spindle motor adapted to drive the recording medium.

25. The apparatus of claim 17, wherein said means for estimating the rotation period includes:
means for determining a rotation period of a spindle motor based on a target speed of the spindle motor.

26. The apparatus of claim 17, further comprising:
means for recalculating the update interval for the RRO cancellation control voltage if the rotation period changes.

27. The apparatus of claim 17, wherein said means for updating performs updates using a software timer independent of rotation of a spindle motor adapted to drive the recording medium.

28. The apparatus of claim 17, wherein said means for updating performs updates using a counter independent of rotation of a spindle motor adapted to drive the recording medium.

29. The apparatus of claim 17, wherein the RRO cancellation control voltage is applied through a feed-forward control.

30. The apparatus of claim 17, wherein the recording medium includes:
a compact disc (CD); and
a digital versatile disc (DVD).

31. The apparatus of claim 17, wherein the recording medium is an optical recording medium.

32. The apparatus of claim 17, further comprising:
monitoring a residual RRO; and
increasing the number of update based on an amount of the residual RRO.

33. A system for canceling repeatable run-out (RRO) errors in positioning on a recording medium using a RRO cancellation control voltage, said system comprising:
a rotation period determiner adapted to receive a pulse signal from a disc driver for driving the recording medium; and
a RRO cancellation generator coupled to said rotation period determiner, said RRO cancellation generator outputting an updated cancellation control signal at an update interval such that a desired number of updates are performed per rotation in accordance with a clock signal independent of rotation of the spindle motor.

34. The system of claim 33, further comprising:
a spindle speed controller coupled to said rotation speed detector and a spindle motor of the disc driver; and
a servo controller adapted to control tracking and positioning of a read/write unit of the disc driver.

35. The system of claim 33, wherein said RRO cancellation generator includes:
a memory adapted to store information of a sinusoidal function representing the RRO cancellation control voltage.

36. The system of claim 35, wherein the information is in form of a lookup table.

37. The system of claim 33, said RRO cancellation generator includes:
a calculator adapted to calculate a sinusoidal function representing the RRO cancellation control voltage using a difference equation.

38. The system of claim 33, wherein said rotation period determiner includes:
a rotation detector adapted to measure a rotation period of the spindle motor.

39. The system of claim 33, wherein said rotation period determiner includes:
a rotation period calculator adapted to calculate a rotation period of a spindle motor based on a target speed of the spindle motor and servo control information.

40. The system of claim 33, wherein said rotation period determiner includes:
a rotation period re-calculator adapted to recalculate the update interval for the RRO cancellation control voltage if the rotation period changes.

41. The system of claim 33, wherein the clock signal is supplied by a software timer.

42. The system of claim 33, wherein the clock signal is supplied by a hardware counter.

43. The system of claim 33, wherein the recording medium includes:
a compact disc (CD); and
a digital versatile disc (DVD).

44. The system of claim 33, wherein the recording medium is an optical recording medium.

45. The system of claim 33, further comprising:
a monitor adapted to monitor a residual RRO; and
an update incrementor coupled to said monitor and said RRO cancellation generator, adapted to increase the number of update based on an amount of the residual RRO.

46. A program storage device readable by a machine, tangibly embodying a program of instructions executable by the machine to perform a method for canceling repeatable run-out (RRO) errors in positioning on a recording medium using a RRO cancellation control voltage, said method comprising:
estimating a rotation period of the recording medium;
determining an update interval for the RRO cancellation control voltage based on the estimated rotation period and a desired number of updates to be performed per rotation;
updating a value of the RRO cancellation control voltage if a time period passed from a last update is greater than the update interval; and
applying the updated RRO cancellation voltage to control the positioning.

47. The program storage device of claim 46, wherein said method further comprises:
determining a phase and a magnitude of the RRO cancellation control voltage for a RRO frequency range.

48. The program storage device of claim 47, wherein said method further comprises:
generating a sinusoidal function having the phase and the magnitude of the RRO cancellation control voltage.

49. The program storage device of claim 48, wherein said method further comprises:
storing information of the sinusoidal function representing the RRO cancellation control voltage.

50. The program storage device of claim 48, further wherein said method further comprises:
calculating the sinusoidal function using a difference equation.

51. The program storage device of claim 47, wherein in said method, said determining the RRO cancellation control voltage includes:
measuring a servo control voltage in a feedback control loop for a driving program storage device of the recoding medium, the servo control voltage being measured for a RRO frequency range when the positioning is locked.

52. The program storage device of claim 47, wherein in said method, said determining the RRO cancellation control voltage includes:
measuring a tracking error in the positioning for a RRO frequency range when the positioning is locked.

53. The program storage device of claim 46, wherein in said method, said estimating the rotation period includes:
measuring a rotation period of a spindle motor adapted to drive the recording medium.

54. The program storage device of claim 46, wherein in said method, said estimating the rotation period includes:
determining a rotation period of a spindle motor based on a target speed of the spindle motor.

55. The program storage device of claim 46, wherein said method further comprises:
recalculating the update interval for the RRO cancellation control voltage if the rotation period changes.

56. The program storage device of claim 46, wherein in said updating the time period is measured using a software timer independent of rotation of a spindle motor adapted to drive the recording medium.

57. The program storage device of claim 46, wherein in said updating the time period is measured using a counter independent of rotation of a spindle motor adapted to drive the recording medium.

58. The program storage device of claim 46, wherein in said method, the RRO cancellation control voltage is applied through a feed-forward control.

59. The program storage device of claim 46, wherein the recording medium includes:
a compact disc (CD); and
a digital versatile disc (DVD).

60. The program storage device of claim 46, wherein the recording medium is an optical recording medium.

61. The program storage device of claim 46, wherein said method further comprises:
monitoring a residual RRO; and
increasing the number of update based on an amount of the residual RRO.

* * * * *